United States Patent [19]

Nakagawa et al.

[11] Patent Number: 5,151,609

[45] Date of Patent: Sep. 29, 1992

[54] METHOD OF DETECTING SOLID SHAPE OF OBJECT WITH AUTOFOCUSING AND IMAGE DETECTION AT EACH FOCUS LEVEL

[75] Inventors: Yasuo Nakagawa, Chigasaki, Japan; Shree K. Nayer, Pittsburgh, Pa.

[73] Assignee: Hitachi, Ltd., Tokyo, Japan

[21] Appl. No.: 561,823

[22] Filed: Aug. 2, 1990

[30] Foreign Application Priority Data

Aug. 2, 1989 [JP] Japan .................................. 1-199223

[51] Int. Cl.$^5$ ............................................. G01N 21/86
[52] U.S. Cl. .................................... 250/561; 356/376; 250/201.7
[58] Field of Search ...................... 250/561, 221, 201.7; 356/376, 381, 1, 4

[56] References Cited

U.S. PATENT DOCUMENTS

| | | | |
|---|---|---|---|
| 4,929,843 | 5/1990 | Chmielewski, Jr. et al. | 250/561 |
| 4,996,415 | 2/1991 | Tanaka et al. | 250/561 |

FOREIGN PATENT DOCUMENTS 61-124809  7/1986  Japan .

OTHER PUBLICATIONS

Takatoshi Ota et al., "A Method for Image Composition Using Image Variance", Journal of the Institute of Electronics and Communication Engineers of Japan, 83/10 vol. J66-D, No. 10, pp. 1245-1246.
A. P. Pentland, "A New Sense for Depth of Field", IEEE Transactions on Pattern Analysis and Machine Intelligence, vol. PAMI-9, No. 4, pp. 523-531 (Jul. 1987).
P. Grossmann, "Depth from focus", Pattern Recognition Letters, vol. 5, No. 1, pp. 63-69 (Jan. 1987).
T. Darrel et al., "Pyramid Based Depth from Focus", Proceedings of Computer Vision and Pattern Recognition, pp. 504-509, The Computer Society, Ann Arbor, MI, Jun. 5-9, 1988.

Primary Examiner—David C. Nelms
Assistant Examiner—T. Davenport
Attorney, Agent, or Firm—Fay, Sharpe, Beall, Fagan, Minnich & McKee

[57] ABSTRACT

The solid shape of an object is detected by viewing the objects along a Z-axis direction. A plurality of images of the object are picked up at different focus levels having correspondingly different Z-axis coordinate values. Focus measure values are calculated with respect to each of the pixels that are in each of the object images and that are designated by the same X- and Y-coordinate values. The focus measure values of the pixels in the object images having the same X- and Y-coordinate values are compared with each other to detect maximum focus measure values. The solid shape of the object is then estimated based on the Z-coordinate value of the focus level of the object image having the maximum detected focus measure values.

31 Claims, 6 Drawing Sheets

METHOD OF DETECTING SOLID SHAPE OF OBJECT WITH AUTOFOCUSING AND IMAGE DETECTION AT EACH FOCUS LEVEL

BACKGROUND OF THE INVENTION

The present invention relates to a method of detecting a solid shape of an object. The present invention relates to the method of detecting a solid shape of an object, by aiming at focus levels of an optical image of an object.

An example of the method of detecting a solid shape of an object, by aiming at focus levels, has been disclosed in the Japanese Patent Application Laid-Open No. 61-124809. According to this method, with respect to a rugged pattern which constitutes an object to be inspected, respective pattern detection is made by changing focus levels, thereby permitting calculation of plane and solid dimensions of the pattern from such information of focus levels and information of pattern positions. To be more concrete, in taking an LSI wafer pattern as an example, pattern images whose focal planes are successively changed by a focus adjustment mechanism are detected, and by extracting and synthesizing the sharpest portions of such image signals, the following will become possible:

(i) Detection of step edges of a pattern, in focus with either an upper edge of a step or a lower edge of a step in step edges of the pattern.

(ii) Detection of solid dimensions (thickness) of a pattern from focus levels in case the sharpest portion is extracted.

(iii) In the case of a photoresist pattern, from the image signal having maximum contrast, detection of the upper and lower edge levels in step edges of the pattern as the maximum rate of such changes.

On the other hand, according to a paper by Takatoshi Ota et al., entitled "A Method for Image Composition Using Image Variance", Journal of the Institute of Electronics and Communication Engineers of Japan, '83/10 Vol. J66-D No. 10, pp.1245-1246, it is possible to obtain an image, well-focused on the entire image, by looking for the brightness variance in each local region from object images with different focus levels and by extracting and synthesizing a focused region in each image therefrom.

SUMMARY OF THE INVENTION

However, according to the Japanese Patent Application Laid-Open No. 61-124809, even though the upper and lower edge levels and thickness in step edges of a pattern can be detected by specifying the level of the portion having characteristics in peculiar contrast or in peculiar signal waveform, such as the upper and lower edge levels in step edges of a thin film pattern, it is not possible to detect the entirety of the solid shape, including the flat portion and step edges of the pattern.

On the other hand, in the paper, entitled "A Method for Image Composition Using Image Variance", even though an image with a single level of high focus quality can be obtained from images having different focus levels, no consideration is made for obtaining a solid shape from such images.

Therefore, a solid shape has not been detected at all from images having different focus levels up till now. Still more, nothing is considered for detection of a solid shape, from images obtained by changing the focus level in the height direction (direction of axis z), for example, by $\Delta z$, in providing the height resolution or the depth resolution, which is smaller than $\Delta z$.

A first object of the present invention is to provide a method of detecting a solid shape of an object, from images having different focus levels.

A second object of the present invention is to provide a method of detecting a solid shape of an object, with a resolution which is smaller than the focus level differences between images.

A third object of the present invention is to provide a method of detecting a solid shape of an object, even if such object may have a surface without texture, for example, a diffusion surface, mirror surface, etc.

Further, a fourth object of the present invention is to provide a method of detecting a solid shape of an object at a higher speed.

The above first object is accomplished according to the present invention by providing a method of detecting a solid shape of an object which comprises the steps of picking up a plurality of object images with different focus levels, with respect to an object whose shape is to be detected, of calculating the focus measure of each of the pixels in each of such images, of comparing the focus measures of the pixels which are at the same position in such images with each other so as to detect the maximum value among these focus measures, and of estimating a solid shape of the object based on the focus level of an object image with the maximum value of focus measure.

The above second object is accomplished according to the present invention by providing a method of detecting a solid shape of an object which comprises the steps of interpolating a focus level of an object image presenting the maximum focus measure, based on the focus measures of each of the pixels at the same position in a plurality of object images as well as the focus levels of such object images, and estimating a solid shape of the object based on such interpolated focus level.

The above third object is accomplished according to the present invention by providing a method of detecting a solid shape of an object which comprises the step of picking up a plurality of object images by illuminating the object so as to produce the texture contrast on the surface of the object.

The above fourth object is accomplished according to the present invention by providing a method of detecting a solid shape of an object which comprises the step of picking up a plurality of object images, wherein a plurality of object images are picked up while their focus levels are continuously changed. Further, the fourth object is also accomplished according to the present invention by providing a method of detecting a solid shape of an object, wherein interpolation of focus level of an object image which presents the maximum focus measure, is made by referring to a look-up table having stored focus measures, which have been calculated beforehand, with respect to pixels at the same position in a plurality of object images.

BRIEF DESCRIPTION OF THE DRAWINGS

In the accompanying drawings:

FIGS. 2(a) through 2(d) are diagrams exemplifying the steps of detecting a solid shape of an object from a plurality of object images picked up at different focus levels, according to the present invention, of which FIG. 2(a) is a diagram exemplifying image signal waveforms of three object images, picked up at different focus levels, FIG. 2(b) is a graph showing the focus measures, which have been calculated with respect to the image signals shown in FIG. 2(a), FIG. 2(c) is a graph showing the distribution of the focus measures in a direction of axis z at coordinate value X on axis x in FIG. 2(b), and FIG. 2(d) is a diagram which explains that the coordinate value of the object on axis z at coordinate value X on axis x, namely the height, can be obtained from coordinate value Zp on axis z, where the focus measure represents the maximum value;

DETAILED DESCRIPTION OF EMBODIMENTS

Figure 1:
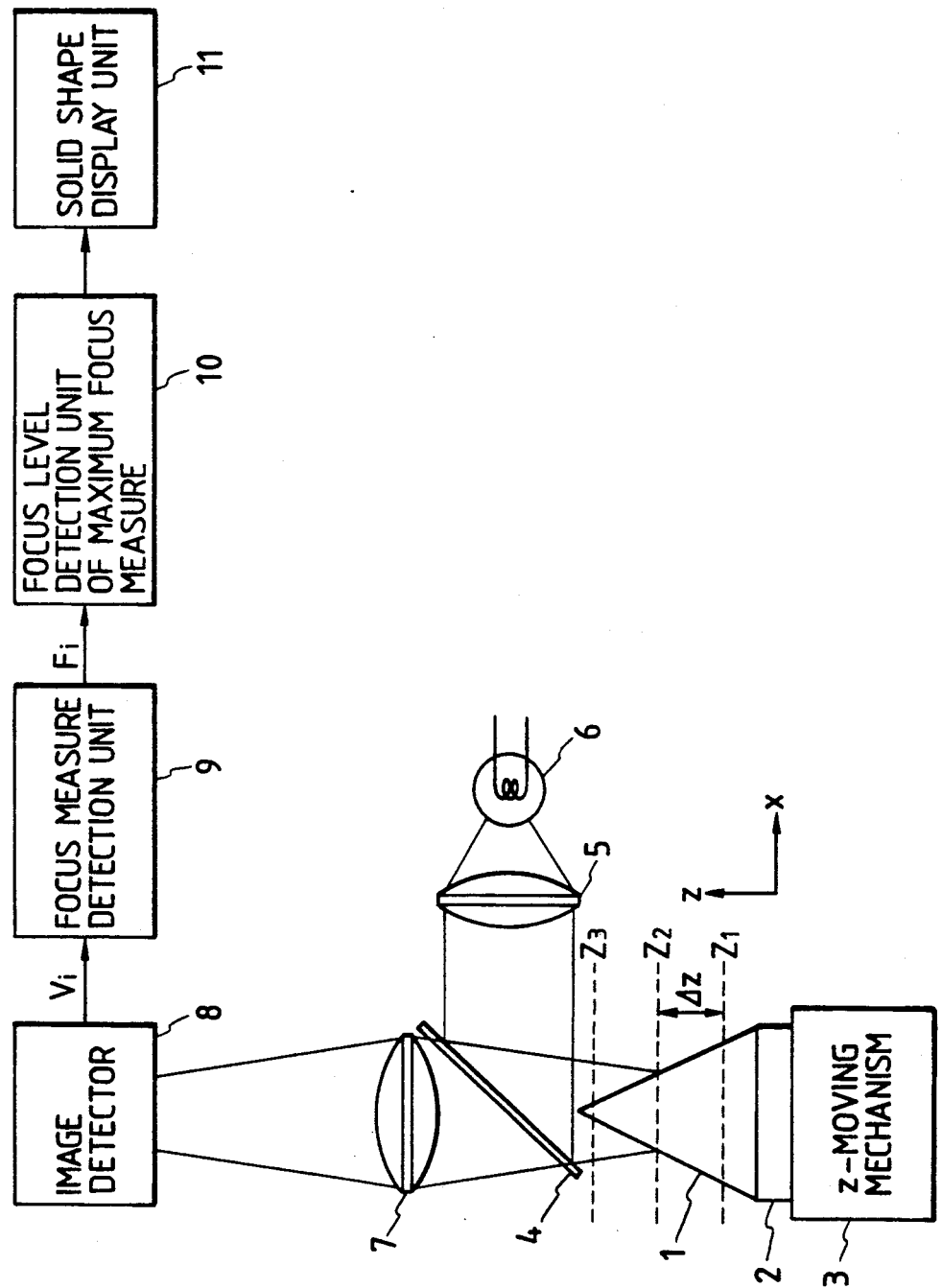
FIG. 1 is a block diagram of equipment which carries out a method of detecting a solid shape of an object according to the present invention.

First, an equipment for carrying out a method of detecting a solid shape of an object according to the present invention is explained. FIG. 1 shows its brief construction together with an object 1. The object 1 in this example is supposed to have a high-contrast random texture, such as the sinter of metalic particles, etc., on its surface, thereby permitting the detection of the focus measure on its surface under normal bright-field illumination.

That is to say, it is so arranged that the object 1 will have its image detected by an image detector 8, consisting of an imaging equipment, such as a TV camera or a linear image sensor, through a focusing lens 7, in a condition where the object 1 is being illuminated by the illuminating light from a lamp 6, through an illuminating lens 5 and a half mirror 4, which its height is being moved vertically by a z-moving mechanism 3 via a specimen table 2. Although images can be detected by moving the focusing lens 7 or the entire image detecting optical system including the focusing lens 7, a plurality of images at different focus levels can be obtained. In this example, for simplicity in explanation, the height of the focus level is shown as $Z_1$, $Z_2$, $Z_3$ ($Z_3 - Z_2 = Z_2 - Z_1 = \Delta z$ (fixed) is supposed). Further, the focus level of the image detecting optical system, in the condition shown in the diagram, is shown to agree with $Z_2$. Now, in FIG. 2(a), image signals $V_1$, $V_2$, $V_3$ respectively corresponding to such heights $Z_1$, $Z_2$, $Z_3$ are exemplified. Since the image is the clearest at the focused region, the image signal has the largest signal amplitude at the focused region in general, and the signal frequency is also high. Explanation is made by returning to FIG. 1 again. In a focus measure detection unit 9, it is so arranged that the focus measure of each point on the input image, namely each pixel, can be obtained by the image signals $V_1$, $V_2$, $V_3$ from image detector 8. The focus measure stated here is defined as the numerical value representing a state of an image point being in focus or out of focus. The focus measure can be obtained in the following manner, for example.

That is, when a detected image of the object (signal level of pixels designated in x and y coordinates) is $V_i(x, y)$, in case the height of focus level is $Z_i$ ($i = 1, 2, \ldots, n$), a contrast image $C_i(x, y)$ can be obtained by equation (1) from the detected image $V_i(x, y)$.

$$C_i(x, y) = |-V_i(x - 1, y) + 2V_i(x, y) - V_i(x + 1, y)| + |-V_i(x, y - 1) + 2V_i(x, y) - V_i(x, y + 1)| \quad (1)$$

Further, the focus measure $F_i(x, y)$ can be obtained by equation (2) from $C_i(x, y)$.

$$F_i(x, y) = \sum_{\Delta x = -m}^{m} \sum_{\Delta y = -m'}^{m'} C_i(x + \Delta x, y + \Delta y) \quad (2)$$

where m, m' are constants determined previously, and they show a summation region of local image.

As is clear from equation (2), the focus measure $F_i(x, y)$ corresponds to local summation, namely, smoothing of the contrast image $C_i(x, y)$.

Figure 3:
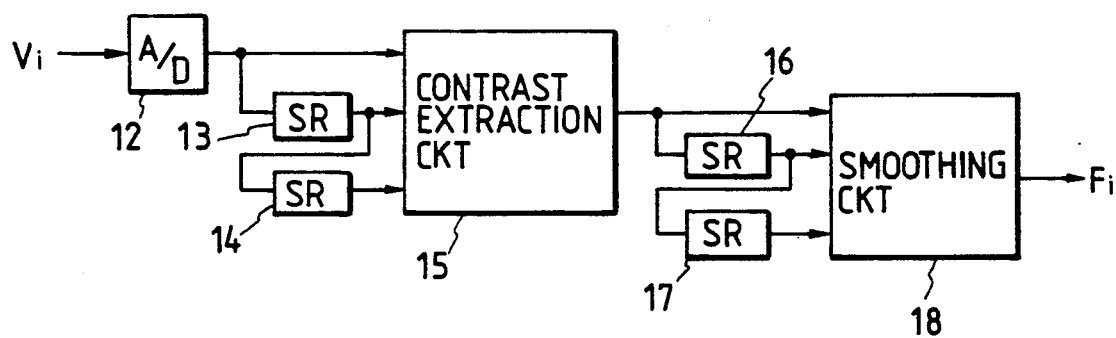
FIG. 3 is a block diagram showing a concrete example of a focus measure detection unit shown in FIG. 1.

FIG. 3 shows an example of a concrete construction of the focus measure detection unit. As shown in the diagram, it is so arranged that the image signals of the detected image $V_i(x, y)$ are successively converted into digital quantities by an A/D (analog-to-digital) converter 12 and then sent through shift registers (with a capacity amount of one scanning line of the detected image) 13, 14 successively, thereby additionally obtaining image signals before one scanning line and before two scanning lines respectively from shift registers 13, 14. Therefore, when these image signals and the image signals from the A/D converter 12 are input into a contrast extraction circuit 15, the contrast image $C_i(x, y)$ can be obtained in the contrast extraction circuit 15 based on each of these image signals according to equation (1) therein. The contrast image $C_i(x, y)$ obtained as above is input into a smoothing circuit 18, together with that going through shift registers (with capacity amount of one scanning line of detected image) 16, 17 successively and that going through the shift register 16 only, and the focus measure $F_i(x, y)$ can be obtained in the smoothing circuit 18, according to equation (2). Since the input into the smoothing circuit 18 is as shown in the diagram, the previously described constant m' is 1 and the value of m is also set at 1 correspondingly thereto in this example. Since the above processing can be processed in pipeline way, such processing can be carried out on a real-time basis.

Further, when the contrast image $C_i(x, y)$ is calculated, in case its value is below a predetermined threshold $T_1$, $C_i(x, y)$, it may be processed in the following manner.

$$C_i(x, y) = 0 \quad (\text{In case } C_i(x, y) \leq T_1) \quad (3)$$

This is the processing for noise removal in the region out of focus. Further, while the contrast image $C_i(x, y)$ is expressed as an absolute sum of second order differentials with respect to 3 (number of pixels in axis x direction)×3 (number of pixels in axis y direction) pixels in this example, second order differentials within still larger range of local image, such as 5×5 pixels, etc. may be obtained, the invention not being restricted to the above example.

For calculation of $C_i(x, y)$, various differential operators, such as Laplacian, Gaussian Laplacian, first order differentials, Roberts' gradient of two by two pixels, etc., other than the second order differentials, can be applied. Depending upon circumstances, $C_i(x, y)$ may be obtained from the variance of brightness, as shown in equation (4).

$$C_i(x, y) = \frac{1}{m^2} \sum_{\Delta x = -m}^{m} \sum_{\Delta y = -m}^{m} \{V_i(x + \Delta x, y + \Delta y) - V_\mu(x, y)\}^2 \quad (4)$$

where $V_\mu(x, y)$ is the average brightness to be given by the following equation.

$$V_\mu(x, y) = \frac{1}{m^2} \sum_{\Delta x = -m}^{m} \sum_{\Delta y = -m}^{m} V_i(x + \Delta x, y + \Delta y) \quad (5)$$

Further, while local summation has been made in equation (2) for smoothing, this can be either average value processing or intermediate value processing, or other noise reduction processing. However, in case the detected image has extremely uniform texture and noise components are also extremely small, it is possible to omit such processing.

Figure 2:
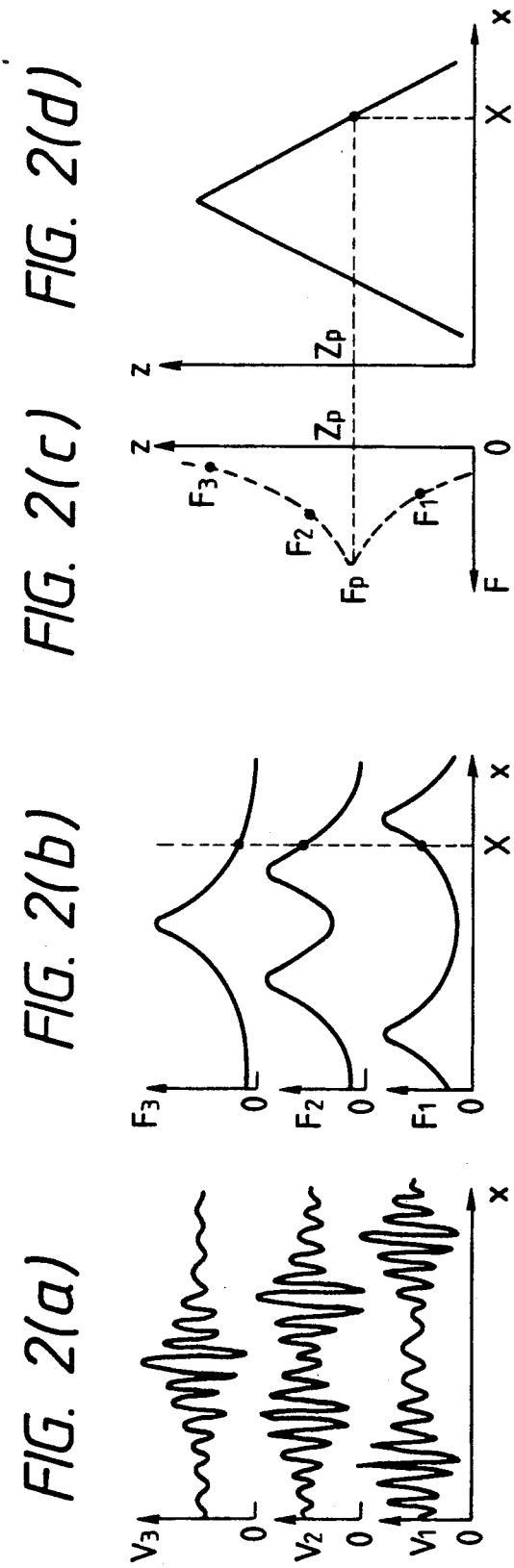

Well, while the focus measure Fi can be obtained in the above manner, FIG. 2(b) shows focus measures $F_1$, $F_2$, $F_3$, obtained from image signals $V_1$, $V_2$, $V_3$ shown in FIG. 2(a), one-dimensionally. As shown in FIG. 2(b), at the image signal level corresponding to the focused region, the focus measure is detected to be large.

Figure 4A:
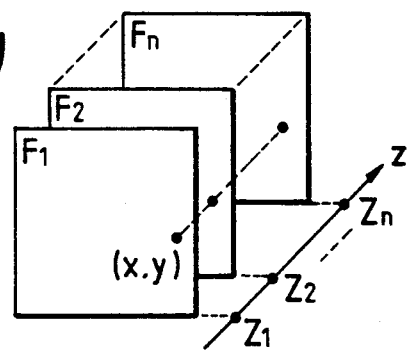
FIGS. 4(a) and 4(b) are diagrams exemplifying the manner of interpolating the focus level of object images which represents the maximum focus measure, based on the focus measures of pixels at the same position in a plurality of object images as well as the focus levels of such object images.
Figure 4B:
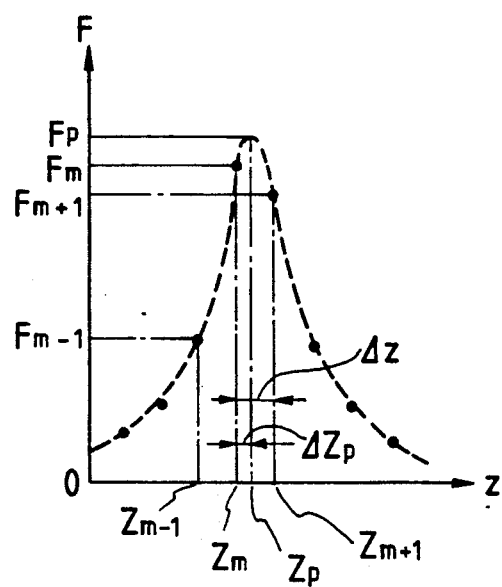

Next, detection of a focus level of the maximum value of focus measure is explained. Now, it is supposed that $F_i(x, y)$ (i = 1, 2, ..., n) are to be obtained for each of the points on the object image, as shown in FIG. 4(a). A focus level which maximizes the focus measure is obtained for each coordinate point (x, y) from such $F_i(x, y)$. FIG. 4(a) shows the condition, where n sheets of the object image are on their focus levels $Z_1, Z_2, ..., Z_n$. FIG. 4(b) shows the plotting of $F_i$ values with respect to the coordinate point (x, y) on the object image shown in FIG. 4(a). When a focus level $Z_p$ on coordinate z corresponding to the maximum value $F_p$ of focus measure F is obtained from the graph in FIG. 4(b), it expresses the height of the object surface at coordinate point (x, y). FIG. 2(c) shows a distribution of Fi in the direction of axis z at the coordinate position X on axis x in FIG. 2(b). When the maximum value $F_p$ of focus measure F is obtained from this distribution, so as to obtain the focus level $Z_p$ on coordinate z, it is possible to obtain the focus level $Z_p$ on coordinate z as the height at coordinate position X. When the focus level $Z_p$ on coordinate z where the focus measure becomes maximum is obtained with respect to all coordinate points (x, y), it is possible to obtain heights of all points on the object surface, thereby detecting a solid shape of the object as a result. FIG. 2(d) exemplifies the shape of the object obtained along coordinate x.

As described above, while it becomes necessary to obtain the focus level $Z_p$ on coordinate z with respect to the maximum value $F_p$ of focus measure F, $Z_p$ on coordinate z can be obtained in the following manner, for example.

That is to say, distribution of $F_i(x, y)$ data can be approximated by Gaussian distribution as shown in equation (6).

$$F = F_p \exp\left\{-\frac{1}{2}\left[\frac{z - Z_p}{\sigma}\right]^2\right\} \quad (6)$$

where $\sigma$ shows divergence of F.

In order to obtain the focus level $Z_p$ on coordinate z according to this equation (6), firstly, the maximum value $F_m$ from among $F_i(x, y)$ (i = 1, 2, ..., n) with respect to coordinate point (x, y) and its $Z_m$ on coordinate z, then, the preceding $F_{m-1}(x, y)$ and its $Z_{m-1}$ on coordinate z as well as the succeeding $F_{m+1}(x, y)$ and its $Z_{m+1}$ on coordinate z are obtained. That is, $(F_{m-1}, Z_{m-1})$, $(F_m, Z_m)$, $(F_{m+1}, Z_{m+1})$ are obtained from among $F_i(x, y)$. When these are substituted into F, z in equation (6), $F_p$, $\sigma$, $Z_p$, as unknown numbers, can be obtained in the following manner.

$$Z_p = \frac{1}{2} \cdot \frac{A - B}{C - D} \quad (7)$$

where $A = (Z_{m-1}^2 - Z_m^2)(l_nF_m - l_nF_{m+1})$
$B = (Z_m^2 - Z_{m+1}^2)(l_nF_{m-1} - l_nF_m)$
$C = (Z_{m-1} - Z_m)(l_nF_m - l_nF_{m+1})$
$D = (Z_m - Z_{m+1})(l_nF_{m-1} - l_nF_m)$ $$\sigma = \sqrt{\frac{1}{2} \cdot \frac{Z_m^2 - Z_{m-1}^2 + 2(Z_{m-1} - Z_m)Z_p}{l_nF_{m-1} - l_nF_m}} \quad (8)$$

$$F_p = F_m \exp\left\{\frac{1}{2}\left[\frac{Z_m - Z_p}{\sigma}\right]^2\right\} \quad (9)$$

Therefore, when an operation is carried out with respect to all of the coordinate points (x, y) on the object image according to equation (7), the solid shape Z (x, y) of the object can be obtained. While equations (8) and (9) are not necessarily required in obtaining $Z_p$, it is possible to eliminate background regions, etc., which are out of focus in any level from $Z_1$ to $Z_n$, if the value obtained in equation (7) is used as $Z_p$ as it is only when the $F_p$ value is larger than a predetermined threshold $T_2$ and the $\sigma$ value is smaller than a preset threshold $T_3$, and if a special value, such as 0, for example, is used as $Z_p$ in cases other than the above.

Figure 5:
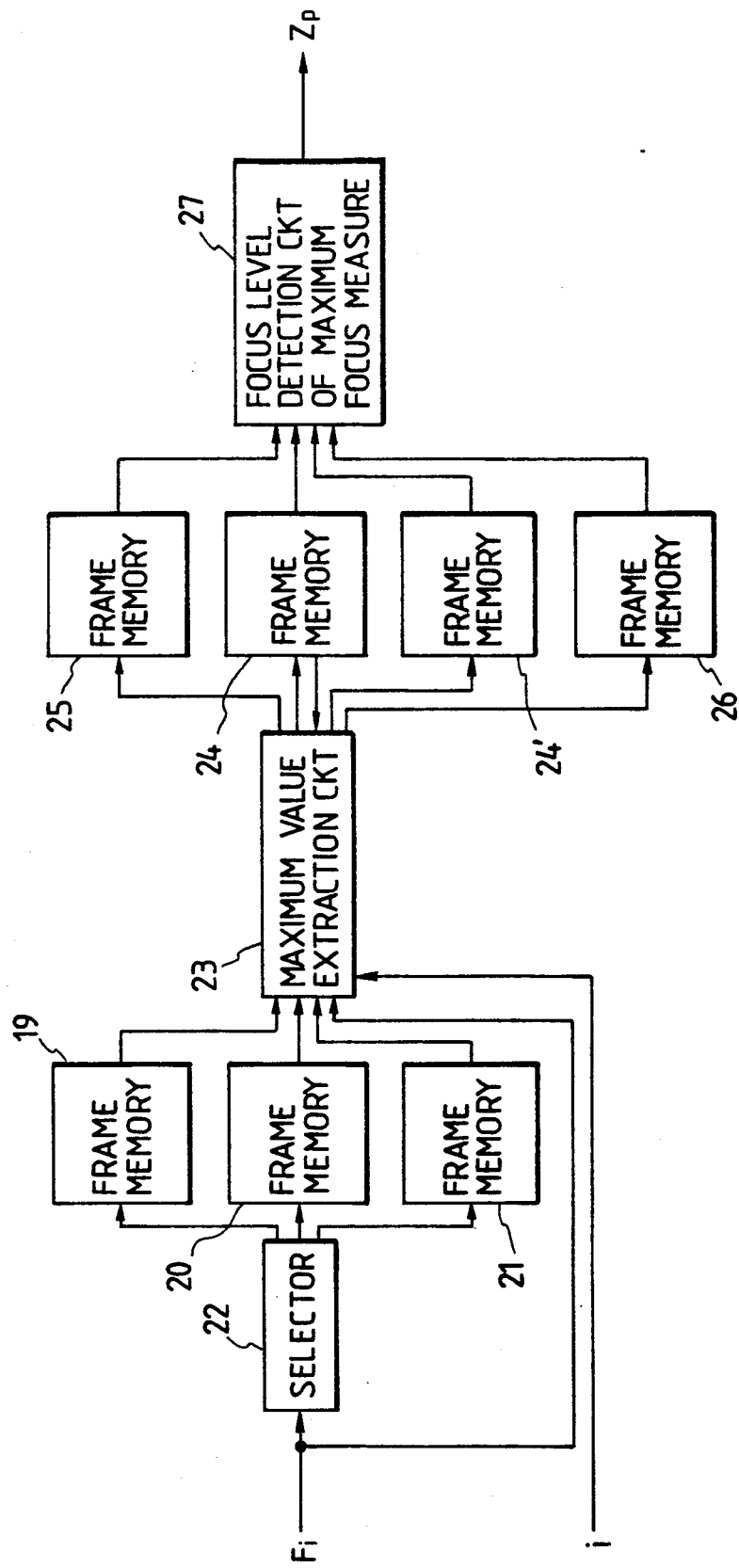
FIG. 5 is a block diagram showing a concrete example of a focus level detection unit of maximum focus measure shown in FIG. 1.

While the focus level of the above maximum value of the focus measure is detected by a focus level detection unit of maximum focus measure 10, FIG. 5 shows an example in concrete construction (provided, however, not including the judgment process by the thresholds $T_2$, $T_3$). The example shown in FIG. 5 consists of frame memories 19, 20, 21 which store three continuous focus measures $F_i(x, y)$, $F_{i-1}(x, y)$, and $F_{i-2}(x, y)$ for updating, a selector 22 which selectively writes Fi (x, y) into those memories 19, 20, 21, a maximum value extraction circuit 23 which judges if $F_{i-1}(x, y)$ is maximum or not, by having $F_{i-2}(x, y)$, $F_{i-1}(x, y)$ from either two of the frame memories 19, 20, 21 and $F_i(x, y)$ from the focus measure detection unit 9 as inputs, a frame memory 24 in which $F_{i-1}(x, y)$ is written as $F_m(x, y)$, in case $F_{i-1}$ (x, y) is the maximum at arbitrary coordinate point (x, y), a frame memory 24' in which $\Delta z \times (i-1)$ ($=Z_m$) is written, obtained in the maximum value extraction circuit 23 in the above case, as $Z_m$, a frame memory 25 in which $F_{i-2}(x, y)$ is written as $F_{m-1}(x, y)$ in the above case, a frame memory 26 in which $F_i(x, y)$ is written as $F_{m+1}(x, y)$ in the above case, and a focus level detection circuit of maximum focus measure 27 which obtains $Z_p(x, y)$ from equation (7), based on $F_{m-1}(x, y)$, $F_m(x, y)$, $F_{m+1}(x, y)$ and $Z_m$, $Z_{m-1}$ ($=Z_m - \Delta z$), $Z_{m+1}$ ($=Z_m + \Delta z$).

Actions of this focus level detection unit of maximum focus measure 10 are explained below. In the selector 22, $F_i(x, y)$ sent on real-time basis from the focus measure detection unit 9 is written as new $F_i(x, y)$ into one of frame memories 19, 20, 21, where the earliest $F_{i-2}(x, y)$ of two preceding frames (detected images) is stored. As a result therefrom, in the remaining two of the frame memories 19, 20, 21, there are always stored $F_{i-1}(x, y)$, $F_{i-2}(x, y)$, which are respectively one frame preceding and two frames preceding with respect to such $F_i(x, y)$. In the maximum value extraction circuit 23, whenever a detected image is obtained, judgment is made whether or not the relation shown in equation (10) holds at each coordinate point (x, y), according to $F_{i-1}(x, y)$, $F_{i-2}(x, y)$ from any two of the frame memories 19, 20, 21 and $F_i(x, y)$ from the focus measure detection unit 9.

$$F_{i-2}(x, y) < F_{i-1}(x, y) \geq F_i(x, y) \quad (10)$$

In case equation (10) holds, $F_{i-1}(x, y)$ is presumed to be the maximum value. Then, judgment is made whether or not the above is larger than $F_m(x, y)$ stored in the frame memory 24 until now, by equation (11).

$$F_{i-1}(x, y) > F_m(x, y) \quad (11)$$

In case equation (11) does not hold, no processing is carried out at all. However, in case it holds, $F_{i-1}(x, y)$ is taken as the maximum value obtained until now, and updated processing is carried out by to make it the new $F_m(x, y)$. In this updated processing, while $F_{i-1}(x, y)$ is written into the frame memory 24 as $F_m(x, y)$, $Z_m$ ($=\Delta z \times (i-1)$) based on i value at such point of time is written into the frame memory 24', and $F_{i-2}(x, y)$ at such point of time is written into the frame memory 25 as $F_{m-1}(x, y)$, and further $F_i(x, y)$ at such point of time is written into the frame memory 26 as $F_{m+1}(x, y)$.

Accordingly, when the above processing is carried out for $i = 1$ through n, there will be stored $F_m(x, y)$, $F_{m-1}(x, y)$, $F_{m+1}(x, y)$ for maximum value of focus measure, with respect to all coordinate point (x, y) in each of the frame memories 24, 25, 26, and $Z_m$ in the frame memory 24'. Therefore, when the operation shown as equation (7) is carried out in the focus level detection circuit of maximum focus measure 27, the focus level $Z_p(x, y)$ can be obtained for all coordinate points (x, y).

Figure 6:
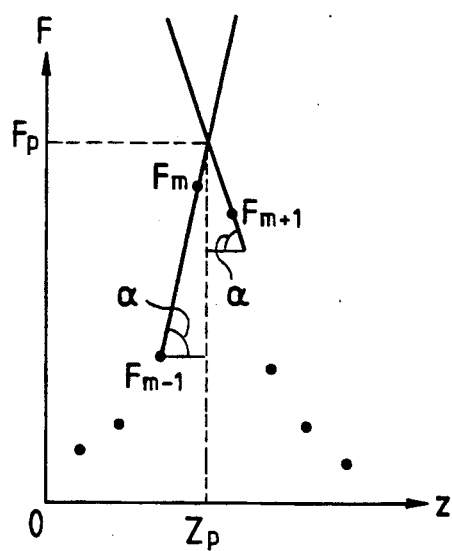
FIGS. 6 and 7 are diagrams, respectively showing another method of interpolating the focus level of the object image which presents the maximum focus measure.
Figure 7:
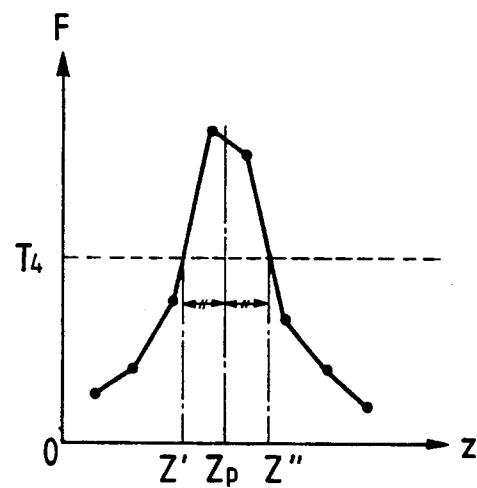

By the way, in the above processing, while Gaussian distribution is obtained according to three data points in a major portion of Gaussian distribution, from which $Z_p(x, y)$ is obtained, it is possible to obtain the Gaussian distribution approximation by least square approximation according to all data points shown in FIG. 4(b), in addition to the above method. Further, calculation of $F_p$, $Z_p$ may be made by methods other than the Gaussian distribution approximation method. For example, as shown in FIG. 6, $F_m(x, y)$ and the smaller of $F_{m-1}(x, y)$, $F_{m+1}(x, y)$ are connected by a straight line, and the sloping angle of this straight line is designated by $\alpha$. Then, a line with the sloping angle $\alpha$ is drawn passing through the larger of $F_{m-1}(x, y)$, $F_{m+1}(x, y)$, and ($F_p$, $Z_p$) is obtained as the intersection of those straight lines. Further, as shown in FIG. 7, when a data point array is approximated by polygonal lines, thereby obtaining intersecting points Z', Z'' with respect to threshold $T_4$, then $Z_p$ can be obtained as follows.

$$Z_p = \frac{Z' + Z''}{2} \quad (12)$$

Depending on circumstances, $Z_p$ may be obtained as the center of gravity position of the data point array.

Figure 8:
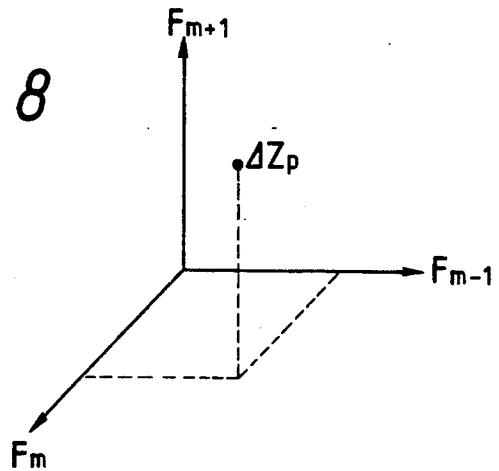
FIG. 8 is a diagram showing a three-dimensional memory, which constitutes a look-up table referred to for interpolating the focus level of the object image which presents the maximum focus measure.

Now, even though $Z_p(x, y)$ can be obtained by Gaussian approximation from equation (7), $Z_p$ can also be obtained without carrying out the operation each time. After all, since $Z_p$ becomes a function of $F_m$, $F_{m-1}$, $F_{m+1}$, when $\Delta Z_p = Z_p - Z_m$ with respect to all combinations of $F_m$, $F_{m-1}$, $F_{m+1}$ is obtained and stored beforehand in a three dimensional memory, consisting of coordinate ($F_m$, $F_{m-1}$, $F_{m+1}$), as shown in FIG. 8, namely, when a look-up table is made ready, it is possible to obtain $Z_p$ at a higher speed by referring thereto. In this case, when $F_m$, $F_{m-1}$, $F_{m+1}$ is normalized by $F_m$ while $Z_m$, $Z_{m+1}$, $Z_{m-1}$ is normalized by $\Delta z$, an operation can be carried out with smaller memory size. Further, while greater emphasis is placed on obtaining $Z_p$ in smaller values than the image detection pitch $\Delta z$ in the focus level detection of the maximum value of focus measure, in the above explanation, $Z_p$ can be simply obtained from the following equation (13), if $Z_p$ is to be obtained in units of $\Delta z$ pitch.

$$Z_p(x, y) = i \mid max \; (F_i(x, y), i = 1, 2, \ldots, n) \quad (13)$$

That is to say, i is obtained in the case where $F_i(x, y)$ becomes maximum with respect to all coordinate points (x, y), and it is to be made $Z_p(x, y)$.

While $Z_p(x, y)$ has been obtained in the above manner, according to the focus level detection of the maximum value of focus measure, a solid shape of the object 1 is displayed in a solid shape display unit 11 based thereon. In the solid shape display unit 11, all $Z_p(x, y)$ from the focus level detection unit of maximum focus measure 10 are once stored in a memory, and then they are displayed as a solid shape on a display device. Various display devices, such as a cathode-ray tube, a liquid crystal display device, a plasma display panel and a printer, etc. can be employed for such display. Since $Z_p(x, y)$ may be used for automatic inspection, shape collection, etc., it is clear that the solid shape display unit 11 may be a judgment circuit for automatic inspection or a large scale memory and electronic computer for shape collection in such cases.

Although the image detection pitch $\Delta z$ is given as a constant value in the above explanation, $\Delta z$ may be a variable value.

Figure 9A:
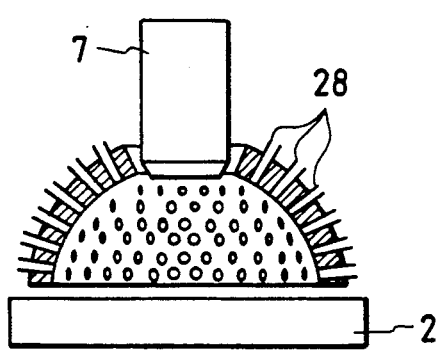
FIGS. 9(a), 9(b) and 9(c) are diagrams showing three examples of a method for illuminating an object according to the present invention.
Figure 9B:
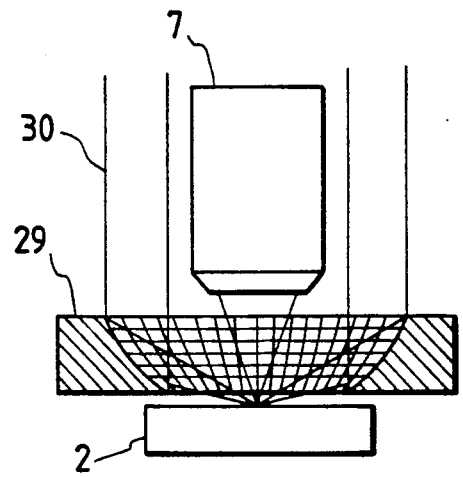
Figure 9C:
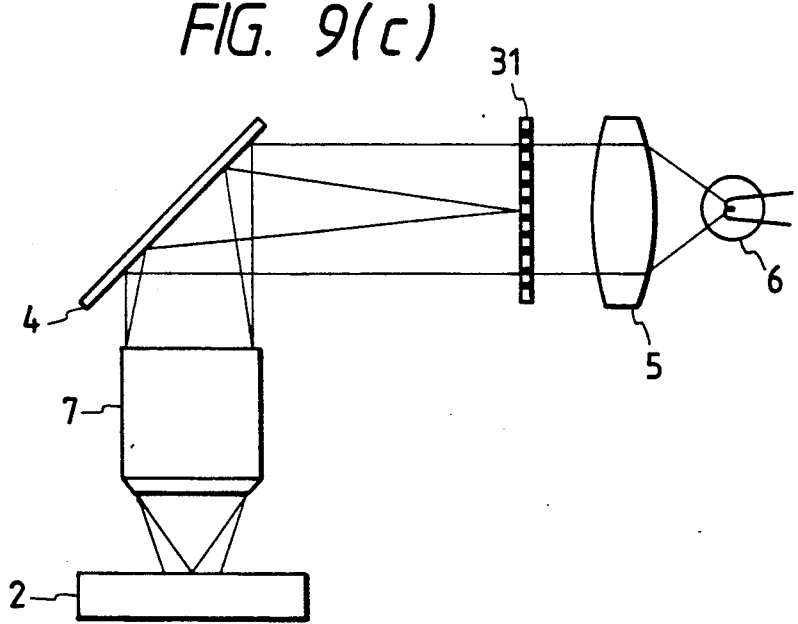

Lastly, other embodiments of the present invention will be explained. In case the texture on the surface of the object is unclear, or in case the object has a diffusion surface, without any texture, or a mirror surface, it is possible to form a texture on the face of diffusion surface, without any texture, or to make the reflection light from a mirror surface into an image of a multi-spot light source, by employing a grid pattern or checkerboard pattern or a multi-spot light. By adopting such methods, it is possible to detect a solid shape for the diffusion surface or mirror surface. In making more detailed explanations, in FIG. 9(a), a multi-spot light source is formed by light guides (a light source is not shown in the diagram) 28 from the periphery, thereby having the object (not shown in the diagram) illuminated by light spots from the light guides 28. Further, in FIG. 9(b), an example is shown, where a grid or checkerboard light source is employed as light source for illumination. Here, a grid or checkerboard pattern is formed by illumination light rays 30 extending towards a parabolic concave mirror 29 for the dark field illumination. Further, while the illumination shown in FIG. 9(c) is the light field illumination, a filter 31 is inserted on the image plane in an illumination light path. As the filter 31, a multi-spot filter (multiple circular openings), or a filter with a grid pattern or checkerboard pattern, striped pattern or random texture, etc. is inserted, so as to have such patterns projected onto the object surface with good contrast. In such an arrangement, since a multi-spot image, grid pattern, checkerboard pattern, striped pattern or random texture is detected by image detection, a solid shape of the object can be detected.

Next, although the case where z-moving of the object is made by steps and image detection is carried out at each stopping position is presumed in the above example, it is also possible to have an arrangement where the object image is detected in the average manner, for example, while the relative positional relationship between the object and the image detecting optical system is changed continuously, when the speed is held constant, so as to permit detection of the solid shape at higher speed. When a sensor of accumulation type, such as a TV camera, is used as the image detector, since the electric charges accumulated in or discharged from a light receiving part during a fixed period (accumulation period) corresponds to the light quantity received at the light receiving part, in the sensor of accumulation type, in case the object image is detected by the sensor of accumulation type while the relative positional relationship between the object and the image detecting optical system is changed continuously, an average image corresponding to the quantity of change within the accumulation period can be obtained. Therefore, in case such image detection is carried out, a plurality of images with different focus levels are detected at higher speed, thereby obtaining a solid shape of the image also at higher speed.

As explained in the foregoing, since it is possible to obtain a height of each point on the object surface by the focus level of the maximum value of focus measure among a plurality of object images with different focus levels, a solid shape of the object can be obtained. Further, since the focus level of the maximum value of focus measure is obtained by interpolating it between images with different focus levels, it is possible to obtain a solid shape of the object still finer than the difference of focus levels between images and with higher precision. Further, it is possible to detect the solid shape, even in case the number of detected images is small. Furthermore, by using illuminating light which generates the texture contrast on a surface of the object, a solid shape of the object can be obtained even if its surface is a mirror surface or diffusion surface. Still additionally, since the image detection with respect to the object is carried out while the relative positional relationship with the image detecting optical system is changed continuously, a solid shape of the object can be obtained at higher speed. Further, with respect to detection of focus level of the maximum value of focus measure with high resolution by interpolation, the focus level of the maximum focus measure can be obtained at high speed, by referring to the data which are calculated beforehand and also stored in the look-up table.

What is claimed is:

1. A method of detecting a solid shape of an object comprising the steps of:
    picking up a plurality of object images with different focus levels with respect to an object whose shape is to be detected;
    calculating the focus measure of each of pixels in each of said object images;
    comparing the focus measures of the pixels on the same position in said object images with each other, so as to detect the maximum value among these focus measures; and
    estimating a solid shape of said object based on the focus level of the object image having the maximum value of focus measure.

2. A method according to claim 1 wherein the focus measure of said each of the pixels is the value obtained by addition of the focus measure of said each of the pixels and the focus measures of pixels around said each of the pixels.

3. A method according to claim 1 wherein the focus measure of said each of the pixels is the average value of the focus measure of said each of the pixels and the focus measures of pixels around said each of the pixels.

4. A method according to claim 1 wherein said object is illuminated in the step of picking up said plurality of object images, so as to generate a texture contrast on a surface of said object.

5. A method according to claim 1 wherein the plurality of object images are picked up in the step of picking up while said focus levels are continuously changed.

6. A method of detecting a solid shape of an object comprising the steps of:
    picking up a plurality of object images with different focus levels with respect to an object whose shape is to be detected;
    calculating the focus measure of each of pixels in each of said object images;
    interpolating the focus level of the object image presenting the maximum focus measure, based on the focus measures of pixels on the same position in said object images and the focus levels of said object images; and
    estimating a solid shape of said object based on the interpolated focus level.

7. A method according to claim 6 wherein the focus measure of said each of the pixels is the value obtained by addition of the focus measure of said each of the pixels and the focus measures of pixels around said each of the pixels.

8. A method according to claim 6 wherein the focus measure of said each of the pixels is the average value of the focus measure of said each of the pixels and the focus measures of pixels around said each of the pixels.

9. A method according to claim 6 wherein said object is illuminated in the step of picking up said plurality of object images, so as to generate a texture contrast on a surface of said object.

10. A method according to claim 6 wherein the plurality of object images are picked up in the step of picking up while said focus levels are continuously changed.

11. A method according to claim 6 wherein the interpolation of the focus level of the image presenting the maximum focus measure is carried out by approximating the relationship between the focus measures of said pixels in said same position in said object images and the focus levels of said object images, with Gaussian distribution.

12. A method according to claim 6 wherein the interpolation of focus level of the object image presenting the maximum focus measure is carried out by referring to a look-up table which records the focus measure values calculated beforehand with respect to said pixels in said same position in said object images.

13. A method of detecting a solid shape of an object placed in a three dimensional coordinate consisting of axes x, y and z, which intersect at a right angle with each other, comprising the steps of:
picking up a plurality of object images at focus levels with different z coordinate values, said object images being those obtained by viewing said object from a direction along axis z;
calculating the focus measure of each of pixels in each of said object images and designated by x and y coordinate values;
comparing the focus measures of the pixels in said object images and designated by the same x and y coordinate values with each other, so as to detect the maximum value among these focus measures; and
estimating a solid shape of said object based on z coordinate value of the focus level of the object image having the maximum value of focus measure.

14. A method according to claim 13 wherein the focus measure of said each of the pixels is the value obtained by addition of the focus measure of said each of the pixels and the focus measures of pixels around said each of the pixels.

15. A method according to claim 13 wherein the focus measure of said each of the pixels is the average value of the focus measure of said each of the pixels and the focus measures of pixels around said each of the pixels.

16. A method according to claim 13 wherein said object is illuminated in the step of picking up said plurality of object images, so as to generate a texture contrast on a surface of said object.

17. A method according to claim 13 wherein the plurality of object images are picked up in the step of picking up while said focus levels are continuously changed.

18. A method of detecting a solid shape of an object placed in a three dimensional coordinate consisting of axes x, y and z, which intersect at a right angle with each other, comprising the steps of:
picking up a plurality of object images at focus levels with different z coordinate values, said object images being those obtained by viewing said object from a direction along axis z;
calculating the focus measure of each of pixels in each of said object images and designated by x and y coordinate values;
interpolating the focus level of the object image presenting the maximum focus measure, based on the focus measures of pixels in said object images and designated by the same x and y coordinate values, and on the focus levels of said object images; and
estimating a solid shape of said object based on z coordinate value of the interpolated focus level.

19. A method according to claim 18 wherein the focus measure of said each of the pixels is the value obtained by addition of the focus measure of said each of the pixels and the focus measures of pixels around said each of the pixels.

20. A method according to claim 18 wherein the focus measure of said each of the pixels is the average value of the focus measure of said each of the pixels and the focus measures of pixels around said each of the pixels.

21. A method according to claim 18 wherein said object is illuminated in the step of picking up said plurality of object images, so as to generate a texture contrast on a surface of said object.

22. A method according to claim 18 wherein the plurality of images are picked up in the step of picking up while said focus levels are continuously changed.

23. A method according to claim 18 wherein the interpolation of focus level of the object image presenting the maximum focus measure is carried out by approximating the relationship between the focus measures of said pixels designated by said same x and y coordinate values and the focus levels of said object images, with Gaussian distribution.

24. A method according to claim 18 wherein the interpolation of focus level of the object image presenting the maximum focus measure is carried out by referring to a look-up table which records the focus measure values calculated beforehand with respect to said pixels designated by said same x and y coordinate values.

25. A method of detecting a three-dimensional shape of a three-dimensional object comprising the steps of:
illuminating light on a surface of the three-dimensional object;
moving said three-dimensional object relatively to a focusing lens in a direction along an optical axis of a photo-detecting system for detecting a two-dimensional optical focused images along x- and y-directions;
picking up a plurality of two-dimensional image signals $Vi(x, y)$ by determining said two-dimensional optical focused images obtained through focusing the light reflected by the surface of the three-dimensional object by means of said photo-detecting system at a plurality of different positions ($Zi=Z1$, $Z2$, $Z3$) in a z-direction obtained by moving three-dimensional object relatively to said focusing lens;
calculating a plurality of two-dimensional focus measure values $Fi(x, y)$ by repeating the differential average operation which substantially averages differentials between brightness value of an objective pixel $(x, y)$ and brightness values of peripheral pixels around the objective pixel based on said two-dimensional image signals $Vi(x, y)$ so as to eliminate high-frequency components from said two-dimensional image signals $Vi(x, y)$, through changing the objective pixel $(x, y)$ along the x- and y-directions on each of said plurality of two-dimensional image signals $Vi(x, y)$; and
detecting said three-dimensional shape of the three-dimensional object by calculating a position ($Zp$) in the z-direction, said position ($Zp$) presenting the maximum value among values of two-dimensional focus measure values $Fi(x, y)$ at said different positions ($Zi$) in the z-direction, on each of the objective pixels (x, y) along the x- and y-directions through changing said objective pixels (x, y).

26. A method according to claim 25, wherein said position (Zp) presenting the maximum value is calculated by an approximation with Gaussian distribution including at least three values of the two-dimensional focus measure values Fi(x, y) for at least three different positions (Zi) in the z-direction.

27. A method according to claim 26, wherein said at least three different positions are a first position (Zm) presenting the largest value of focus measure (Fm) and second and third positions (Zm−1, Zm+1) adjacent to the first position at both sides of the first position.

28. A method according to claim 26, wherein the divergence of Gaussian distribution ($\sigma$) is calculated and said position (Zp) presenting the maximum value is not calculated when the calculated distribution ($\sigma$) is not smaller than a predetermined value.

29. A method according to claim 26, wherein the maximum value (Fp) of Gaussian distribution is calculated and said position (Zp) presenting the maximum value is not calculated when the calculated maximum value (Fp) of Gaussian distribution is not greater than a predetermined value.

30. A method according to claim 25, wherein said differentials are defined by the equation (1) which expresses an absolute sum of second order differentials.

31. A method according to claim 25, wherein said differentials are defined by the equations (4) which expresses a divergence from the average brightness expressed by the equation (5).

* * * * *